(12) United States Patent
Mao et al.

(10) Patent No.: US 7,668,385 B2
(45) Date of Patent: Feb. 23, 2010

(54) JPEG PROCESSING ENGINE FOR LOW PROFILE SYSTEMS

(75) Inventors: Kaixuan Mao, Fremont, CA (US);
Yushan Huang, Hangzhou (CN);
Donghui Wu, Fremont, CA (US);
Anding Zhu, Hangzhou (CN);
Lingxiang Zhou, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 0 days.

(21) Appl. No.: 12/113,866

(22) Filed: May 1, 2008

(65) Prior Publication Data

US 2008/0205782 A1      Aug. 28, 2008

Related U.S. Application Data

(62) Division of application No. 10/666,692, filed on Sep. 18, 2003, now Pat. No. 7,391,913.

(51) Int. Cl.
*G06K 9/36*    (2006.01)
(52) U.S. Cl. ........................ 382/235; 382/232
(58) Field of Classification Search .......... 382/232–253
See application file for complete search history.

(56) References Cited

U.S. PATENT DOCUMENTS

| | | | | |
|---|---|---|---|---|
| 5,327,248 A | * | 7/1994 | Miller et al. ................ | 382/233 |
| 5,408,328 A | * | 4/1995 | Boliek et al. ................ | 382/233 |
| 6,292,619 B1 | * | 9/2001 | Fujita et al. .................... | 386/52 |
| 6,298,166 B1 | * | 10/2001 | Ratnakar et al. ............ | 382/248 |
| 6,553,150 B1 | * | 4/2003 | Wee et al. .................... | 382/243 |
| 6,577,311 B1 | * | 6/2003 | Crosby et al. ............... | 345/428 |
| 6,600,869 B1 | * | 7/2003 | Chen et al. .................... | 386/52 |
| 6,700,932 B2 | * | 3/2004 | Shen et al. .............. | 375/240.12 |
| 7,068,846 B1 | * | 6/2006 | Yaguchi .................... | 382/232 |
| 7,079,690 B2 | * | 7/2006 | Boliek et al. ................ | 382/232 |
| 2001/0016075 A1 | | 8/2001 | Klassen | |
| 2002/0136294 A1 | * | 9/2002 | Culbert .................. | 375/240.02 |
| 2003/0227648 A1 | | 12/2003 | Oshima et al. | |
| 2007/0098297 A1 | * | 5/2007 | Fushiki et al. .............. | 382/276 |

* cited by examiner

*Primary Examiner*—Bhavesh M Mehta
*Assistant Examiner*—Sean Motsinger
(74) *Attorney, Agent, or Firm*—Patent Law Group LLP; David C. Hsia

(57) ABSTRACT

A method is provided for processing minimum coded units (MCUs) in a Joint Photographic Expert Group (JPEG) bit stream representing an image. A data structure is generated for storing MCU block numbers, corresponding MCU block coordinates, and corresponding MCU block editing lists. When an editing operation to the image is received, the editing operation is saved to a group of the MCU block editing lists of a group of the MCUs affected by the editing operation. Later the MCUs are retrieved from the JPEG bit stream one at a time and then processed according to the editing operations in the corresponding MCU blocking editing lists.

12 Claims, 8 Drawing Sheets

270D

| Block No. | Block Coordinates | Block Editing list |
|---|---|---|
| 0 | (r1′, s0′) | 90CCW |
| 1 | (r1′, s0′+1) | 90CCW |
| 2 | (r1′, s0′+1) | 90CCW |
| ... | ... | ... |
| S | (r1′, s1′+1) | Not Available |
| S+1 | (r1', s1′+2) | Not Available |
| ... | ... | ... |
| N | (x1′, y0′) | Redeye Removal + 90CCW |
| N+1 | (x1′, y0′+1) | Redeye Removal + 90CCW |
| ... | ... | ... |
| M | (x0′, y1′) | Redeye Removal + 90CCW |
| M+1 | (x0′, y1′+1) | 90CCW |
| ... | ... | ... |

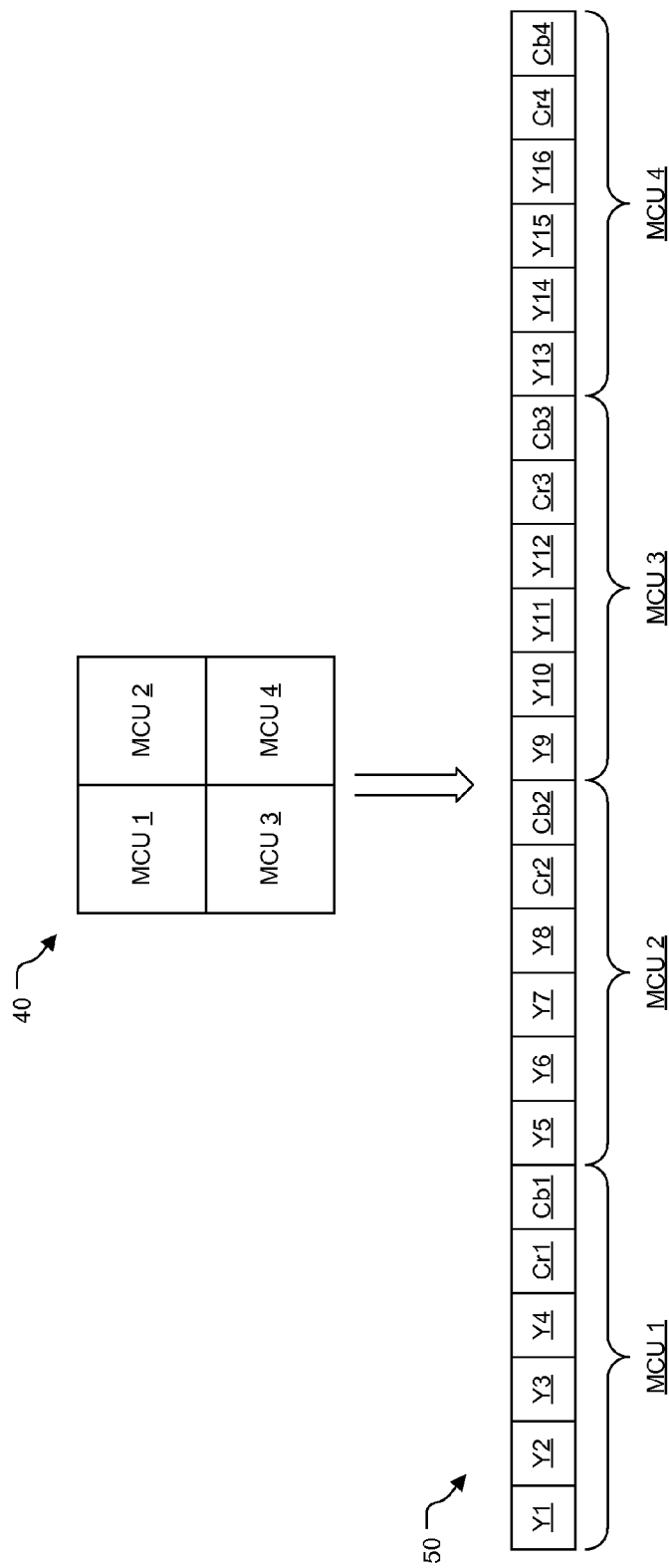

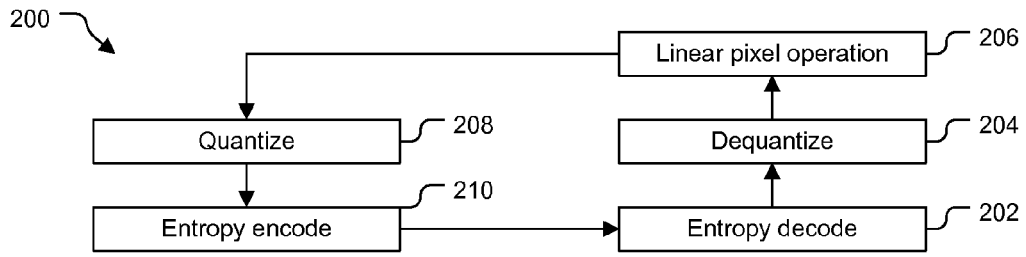
Fig. 8
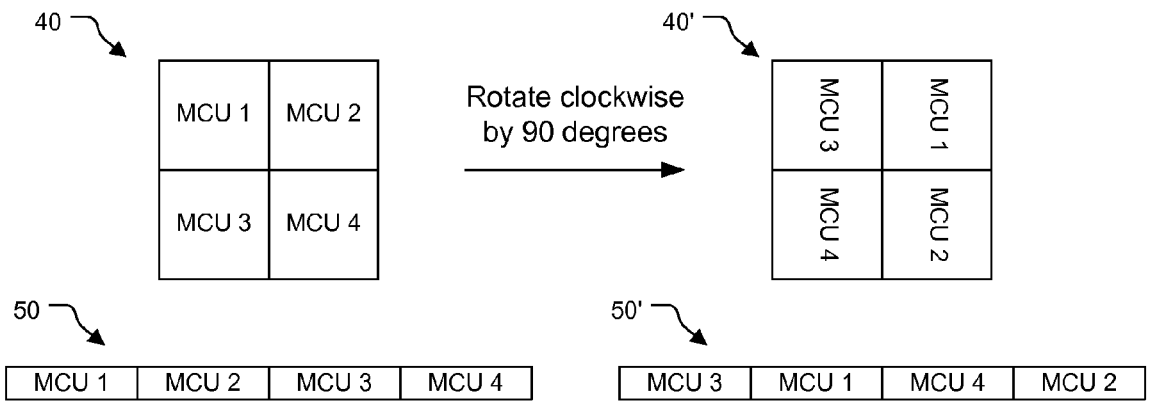
Fig. 9
| Block No. | Block editing list |
|---|---|
| 0 | Enhance + rotate + crop |
| 1 | Rotate |
| 2 | Enhance |
| ... | ... |
Fig. 10

270A

| Block No. | Block Coordinates | Block Editing list |
|---|---|---|
| 0 | (0, 0) | NULL (at start) |
| 1 | (1, 0) | NULL |
| 2 | (2, 0) | NULL |
| 3 | (3, 0) | NULL |
| ... | ... | ... |

| Block No. | Block Coordinates | Block Editing list |
|---|---|---|
| 0 | (0, 0) | NULL |
| 1 | (1, 0) | NULL |
| 2 | (2, 0) | NULL |
| ... | ... | ... |
| N | (x0, y0) | Redeye Removal |
| N+1 | (x0+1, y0) | Redeye Removal |
| ... | ... | ... |
| M | (x1, y1) | Redeye Removal |
| M+1 | (x1+1, y1) | NULL |
| ... | ... | ... |

| Block No. | Block Coordinates | Block Editing list |
|---|---|---|
| 0 | (0, 0) | NULL |
| 1 | (1, 0) | NULL |
| 2 | (2, 0) | NULL |
| ... | ... | ... |
| S | (r1+1, s0) | Not Available |
| S+1 | (r1+1, s0+1) | Not Available |
| ... | ... | ... |
| N | (x0, y0) | Redeye Removal |
| N+1 | (x0+1, y0) | Redeye Removal |
| ... | ... | ... |
| M | (x1, y1) | Redeye Removal |
| M+1 | (x1+1, y1) | NULL |
| ... | ... | ... |

| Block No. | Block Coordinates | Block Editing list |
|---|---|---|
| 0 | (r1', s0') | 90CCW |
| 1 | (r1', s0'+1) | 90CCW |
| 2 | (r1', s0'+1) | 90CCW |
| ... | ... | ... |
| S | (r1', s1'+1) | Not Available |
| S+1 | (r1', s1'+2) | Not Available |
| ... | ... | ... |
| N | (x1', y0') | Redeye Removal + 90CCW |
| N+1 | (x1', y0'+1) | Redeye Removal + 90CCW |
| ... | ... | ... |
| M | (x0', y1') | Redeye Removal + 90CCW |
| M+1 | (x0', y1'+1) | 90CCW |
| ... | ... | ... |

Fig. 12D

JPEG PROCESSING ENGINE FOR LOW PROFILE SYSTEMS

CROSS REFERENCE TO RELATED APPLICATION

This application is a division of U.S. patent application Ser. No. 10/666,692, now U.S. Pat. No. 7,391,913, filed on Sep. 18, 2003, and incorporated herein by reference.

FIELD OF INVENTION

This invention relates to Joint Photographic Expert Group (JPEG) compression technology for computer systems with limited resources.

DESCRIPTION OF RELATED ART

JPEG is designed to manipulate the characteristics of the human visual system. JPEG does this by discarding data conveying slight variances in color (e.g., chrominance) that are not easily recognizable to the human eyes to achieve greater compression of image data.

In JPEG, the source image is divided into a given number of blocks referred to as minimum coded units (MCUs). Each MCU consists several 8×8 blocks of pixel components from the source image. The height and width of the MCUs are determined by the largest horizontal and vertical sampling factors, respectively. The MCUs are processed from left to right and then top to bottom across the source image.

FIG. 1 is a flowchart of a method 10 for a conventional baseline JPEG engine executed by a system (e.g., a processor and a memory) to encode and decode a source image 40 in FIG. 2A. In steps 12 to 20, the system encodes source image 40. In steps 22 to 30, the system decodes the encoded bit stream.

In step 12, the system typically converts the RGB (red, green, and blue) values of the pixels in source image 40 to YCrCb (luminance and chrominance) values.

In step 14, the system separates the Y, Cr, and Cb components into three planes. Typically the system fully samples the Y values but downsamples the Cr and the Cb values as shown in FIG. 2A. The system then splits the Y, Cr, and Cb planes into 8×8 blocks. For a typical ¼ vertical and horizontal downsample of the Cr and the Cb values, MCUs are 16×16 blocks. The system interleaves the Y, Cb, and Cr 8×8 blocks to form the MCUs. In one example shown in FIG. 2B, source image 40 consists MCUs 1, 2, 3, and 4. MCU 1 consists of blocks Y1, Y2, Y3, Y4, Cr1, and Cb1, MCU 2 consists of blocks Y5, Y6, Y7, Y8, Cr2, and Cb2, and so forth.

In steps 16 to 20, the system encodes one MCU at a time. Within the MCU, the system encodes one 8×8 block at a time.

In step 16, the system performs forward discrete cosine transformation (FDCT) to the 8×8 blocks.

In step 18, the system performs quantization to the 8×8 blocks.

In step 20, the system performs entropy encoding (e.g., Huffman encoding) to the 8×8 blocks. After encoding all the MCUs that make up source image 40, the system has generated an encoded bit stream 50 where boundaries between the encoded MCUs are not known because the encoded MCUs do not have a fixed size and there are no markers demarcating their boundaries.

In steps 22 to 26, the system decodes one MCU at a time. Within the MCU, the system decodes one 8×8 block at a time.

In step 22, the system performs entropy decoding (e.g., Huffman decoding) to bit stream 50. By performing entropy decoding, the system is able to extricate the MCUs in the order which they were encoded in bit stream 50. However, the system cannot extricate one MCU before it entropy decodes one or more preceding MCUs in bit stream 50 because the encoded MCUs do not have a fixed size and there are no markers demarcating their boundaries. Thus, even though if only one MCU is requested to be decoded, all preceding MCUs in bit stream 50 must be entropy decoded in order to extricate the requested MCU. This requires the system to have sufficient CPU speed and memory to handle the entropy decoding of all the preceding MCUs.

In step 24, the system performs dequantization to the 8×8 pixel blocks.

In step 26, the system performs inverse discrete cosine transformation (IDCT) to the 8×8 pixel blocks.

In step 28, the system upsamples the Cr and the Cb values. In step 30, the system converts the YCrCb values to RGB values so source image 40 can be displayed.

As described above, method 10 needs to be implemented with a system having the sufficient CPU speed and memory to handle the entropy decoding of all the preceding MCUs of a requested MCU. Thus, method 10 is not well suited for systems for a low profile system such as an embedded system with a low CPU speed and a small memory. Thus, there is a need for a JPEG engine optimized for low profile systems.

BRIEF DESCRIPTION OF THE DRAWINGS

FIGS. 2A and 2B illustrate a source image being encoded and decoded by the conventional baseline JPEG engine of FIG. 1.

FIG. 3 illustrates an encoded bit stream generated by the conventional baseline JPEG engine of FIG. 1.

FIG. 6 illustrates the use of the MCU index to crop a source image in one embodiment of the invention.

FIG. 7 illustrates the use of the MCU index to pan a source image in one embodiment of the invention.

FIG. 8 is a flowchart of a method for a JPEG engine that uses the MCU index to perform linear operations to the source image in the DCT domain in one embodiment of the invention.

FIG. 9 illustrates the use of the MCU index to transform the source image in one embodiment of the invention.

FIG. 10 illustrates the use of the MCU index to edit the source image from an edit action list in one embodiment of the invention.

FIGS. 12A, 12B, 12C, and 12D illustrate a data structure for tracking the editing operations and mapping the original MCUs in an original JPEG bit stream of a source image to the new MCUs in a new JPEG bit stream of a final image in one embodiment of the invention.

SUMMARY

In one embodiment of the invention, a method is provided for processing minimum coded units (MCUs) in a Joint Photographic Expert Group (JPEG) bit stream representing an image. A data structure is generated for storing MCU block numbers, corresponding MCU block coordinates, and corresponding MCU block editing lists. When an editing operation to the image is received, the editing operation is saved to a group of the MCU block editing lists of a group of the MCUs affected by the editing operation. Later the MCUs are retrieved from the JPEG bit stream one at a time and then processed according to the editing operations in the corresponding MCU blocking editing lists.

DETAILED DESCRIPTION

Figure 1:
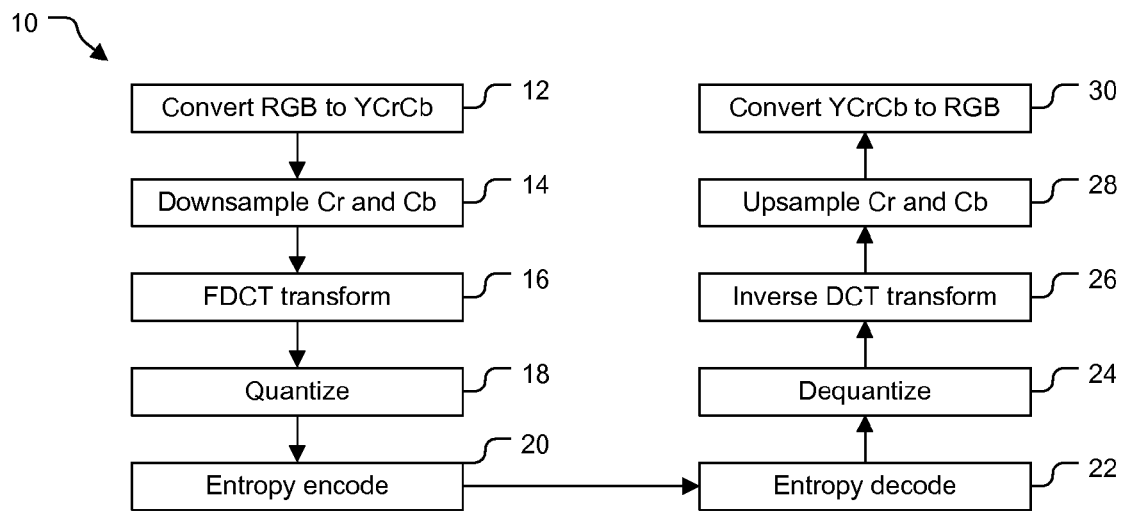
FIG. 1 is a flowchart of a method for a conventional baseline JPEG engine.
Figure 2A:
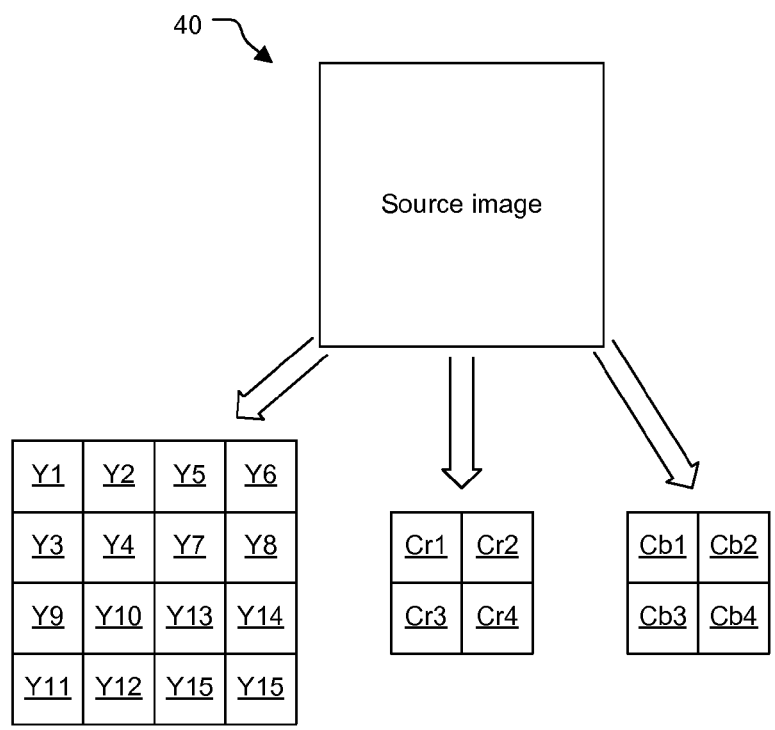
Figure 4:
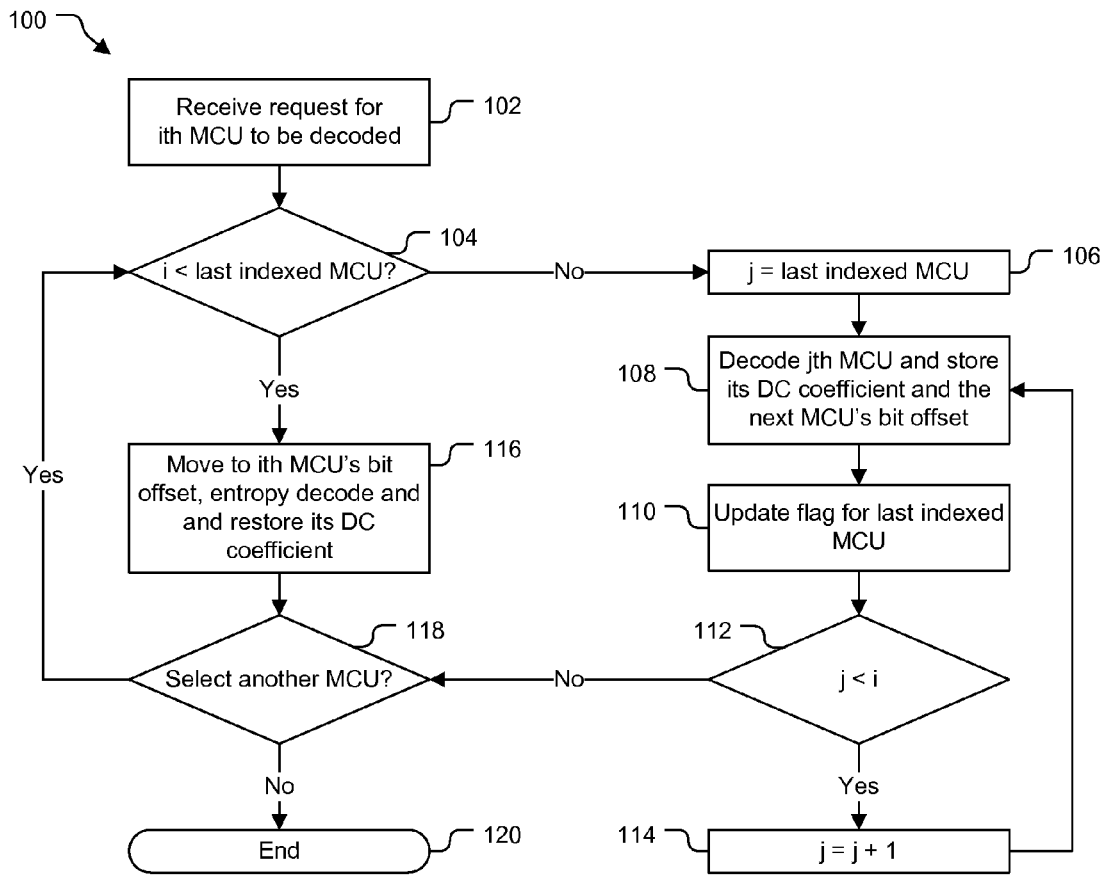
FIG. 4 is a flowchart of a method for a JPEG engine to index and retrieve the MCUs in one embodiment of the invention.

FIG. 4 is a flowchart of a method 100 for a JPEG engine executed by a system (e.g., a processor and a memory) to incrementally index the minimum coded units (MCUs) in encoded bit stream 50 (FIG. 3) generated from source image 40 (FIG. 1) in one embodiment of the invention. Bit stream 50 can be generated by any method that conforms to the baseline JPEG compression standard such as method 10 (FIG. 1).

In step 102, the system receives a request for an $i^{th}$ MCU in bit stream 50. An MCU can be requested for many reasons. For example, a particular MCU may be requested to be retrieved for display so entropy decode, dequantization, and IDCT need to be performed. Alternatively, a particular MCU may be requested so it can be processed in the discrete cosine transformation (DCT) domain. Typically the $i^{th}$ MCU is part of a series of MCUs that is requested for display.

Figure 5:
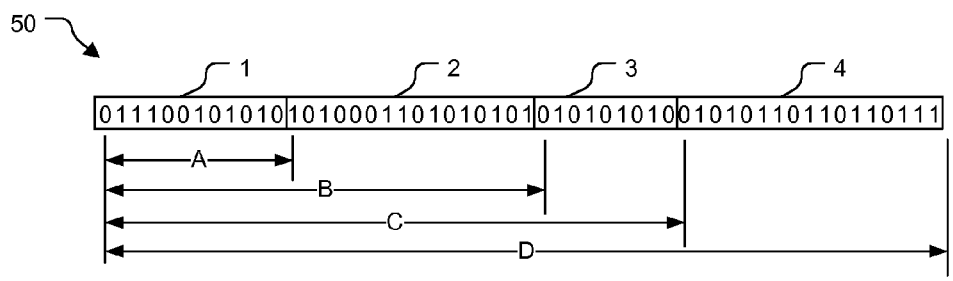
FIG. 5 illustrates an encoded bit stream indexed by the JPEG engine of FIG. 4 in one embodiment of the invention.

In step 104, the system determines if the $i^{th}$ MCU precedes the last indexed MCU in bit stream 50. The last indexed MCU is the MCU that was last to have its bit offset from the start of bit stream 50 (FIG. 5) recorded in an index file 130 (FIG. 5). In index file 130, the last indexed MCU is identified by a flag. If the $i^{th}$ MCU precedes the last indexed MCU in bit stream 50, then step 104 is followed by step 116. Otherwise step 104 is followed by step 106. In one running example of method 100, assume that the $i^{th}$ MCU is the fourth MCU (i.e., MCU 4) and the last indexed MCU is the third MCU (i.e., MCU 3). Thus, step 104 is followed by step 106.

In step 106, the system sets a variable "j" equal to the block number of the last indexed MCU. In the example, the system sets variable j equal to 3. Step 106 is followed by step 108.

In step 108, the system entropy decodes the last indexed MCU. By entropy decoding the last indexed MCU, the system determines the DC coefficient of the last indexed MCU and the start of the next MCU in the bit stream. The system then indexes the next MCU by storing the DC coefficient of the last indexed MCU and the bit offset of the next MCU in index file 130 (FIG. 5). The system stores the DC coefficient of the last indexed MCU so the DC coefficient of the next MCU can be decoded without decoding the last indexed MCU again. In the running example, the system entropy decodes MCU 3 and therefore determines the DC coefficient of MCU 3 and a bit offset C (FIG. 5) of the MCU 4 in bit stream 50. The system then indexes MCU 4 by storing the DC coefficient of MCU 3 and bit offset C of MCU 4 in index file 130 (FIG. 5). Step 108 is followed by step 110.

In step 110, the system updates the flag for the last indexed MCU to MCU j in index file 130 (FIG. 5). In the running example, the system resets the flag at MCU 3 and set the flag at MCU 4 in index file 130. Step 110 is followed by step 112.

In step 112, the system determines if the last indexed MCU precedes the requested $i^{th}$ MCU in bit stream 50. To do so, the system determines if variable j is less than variable i. If so, then step 112 is followed by step 114. If variable j is not less than variable i, then step 112 is followed by step 116. In the running example, variable j is less than variable i (i.e., 3 is less than 4) so step 112 is followed by step 114.

In step 114, the system increments variable j by 1. In the running example, the system increments variable j by 1 so variable j becomes 4. Step 114 is followed by step 108. Steps 108, 110, 112, and 114 repeats until all the MCUs up to and including the $i^{th}$ MCU have been entropy decoded and indexed, after which step 112 is followed by step 118.

In step 116, the system entropy decodes the requested $i^{th}$ MCU. The system does this by looking into index file 130 (FIG. 5) for the bit offset of the requested $i^{th}$ MCU and the DC coefficient of the preceding MCU. Using these values, the system entropy decodes the requested $i^{th}$ MCU from the starting bit and restores the DC coefficient of the requested $i^{th}$ MCU using the DC coefficient of the preceding MCU stored in index file 130. Step 116 is followed by step 118.

In step 118, the system determines if another MCU needs to be decoded. If so, step 118 is followed by step 104 and method 100 repeats until all the requested MCUs have been decoded and also indexed. Step 118 is followed by step 120, which ends method 100.

Instead of incrementally indexing the MCUs as they are requested as shown in method 100 of FIG. 4, the system can of course index the entire source image 40 at once in one embodiment of the invention. In this embodiment, the system would simply entropy decode each of the MCUs and record their bit offset and DC coefficient in index file 130.

MCU indexing can assist in several manipulation of source image 40. In a random JPEG cropping illustrated in FIG. 6, a child JPEG consisting of (x0, y0) to (x1, y1) MCU blocks is cut from an original mother JPEG. Thus, (x0, y0) to (x1, y1) MCU blocks need to be decoded and saved as a separate JPEG file.

Using conventional JPEG method 10, all the MCUs in the mother JPEG would need to be decoded in order determine the boundaries between the MCUs of the child JPEG in the encoded bit stream. However, using JPEG method 100, only the MCUs in the child JPEG will need to be decoded if the first MCU in each row of the child JPEG has been indexed. For example, if (x0, y0) MCU has been indexed already, the system can move to the (x0, y0) MCU bit offset, restore the DC coefficients, and then decode the entire y0 MCU row sequentially. The system can repeat the above steps for each row in the child JPEG if the first MCU in each row has been indexed. Thus, the system saves decoding time and buffer memory as the number of MCUs that need to be decoded is reduced.

Figures 6, 7:
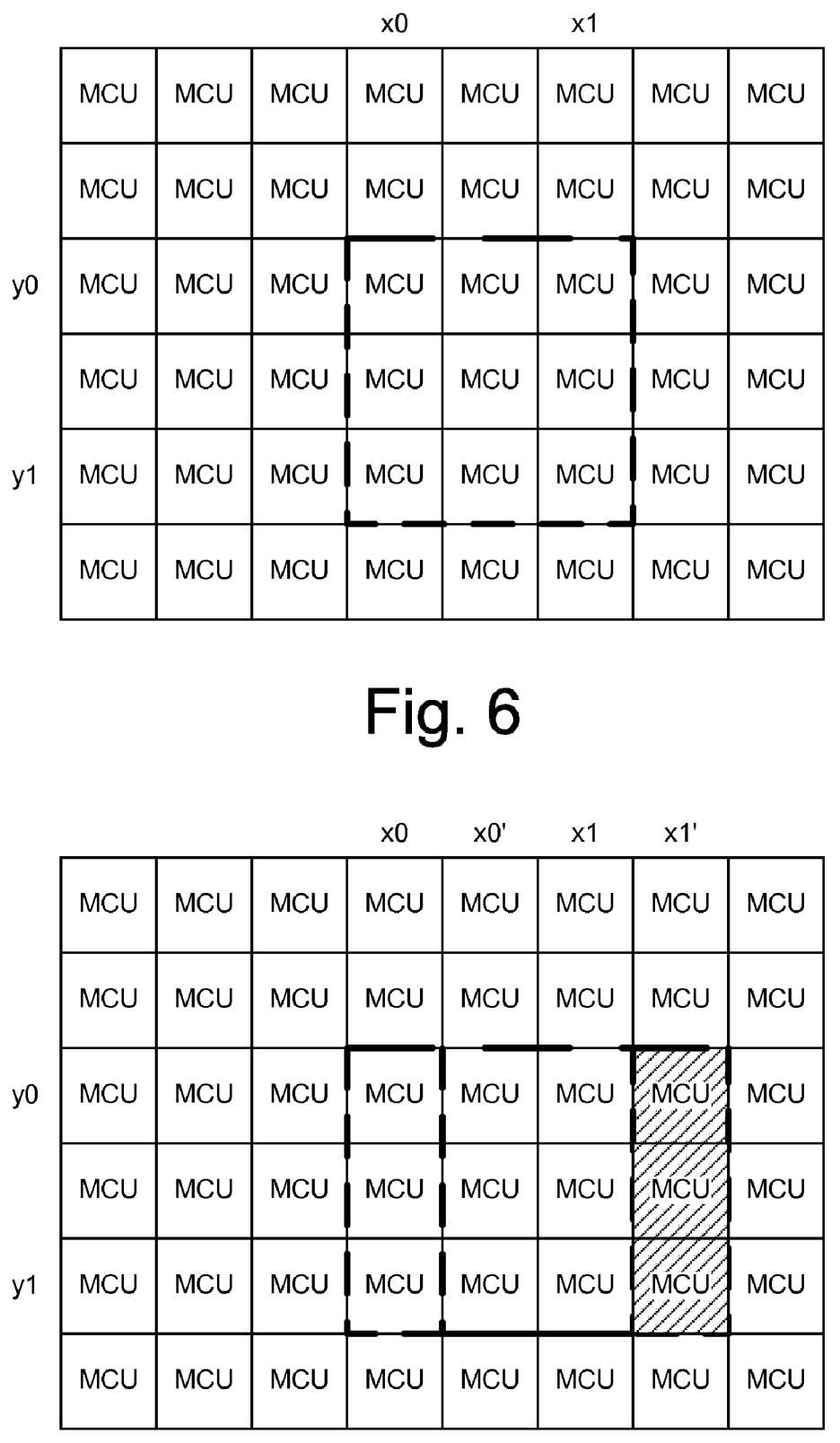

In a JPEG panning illustrated in FIG. 7, a first region consisting of (x0, y0) to (x1, y1) MCUs is panned to a second region consisting of (x0', y0) to (x1', y1) MCUs. As can be seen, (x0', y0') to (x1, y1) MCUs have already been decoded. Thus, only (x1, y0) to (x1', y1) MCUs need to be decoded. Like random cropping, only the (x1, y0) to (x1', y1) MCUs will need to be because the first MCU in each row of the second region has been indexed previously when the first region is decoded. Again, the system saves decoding time and buffer memory as the number of MCUs that need to be decoded has been reduced.

MCU indexing can also assist in the editing of a source image in the DCT domain. FIG. 8 is a flowchart of a method 200 for a JPEG engine executed by the system to perform linear pixel operations to the source image in the DCT domain in one embodiment of the invention. As DCT is a linear transformation, some linear pixel operations can be transferred to the DCT domain. If a linear pixel operation can be realized in DCT domain directly, IDCT and FDCT operation will be saved. When a linear pixel operation is needed for a few pixels within one MCU, the MCU indexing described above can save decoding time and buffer memory as the number of MCUs that need to be decoded is reduced.

In step 202, the system decodes the encoded bit stream to extricate the one or more requested MCUs. In one embodiment, method 100 described above is used to extricate the requested MCUs. The requested MCUs contain the pixels that will undergo the linear pixel operations. In one running example for method 200, the linear pixel operation includes scalar addition, scalar multiplication, or a combination thereof. Using method 100, the system will only need to extricate the requested MCU that contains the pixels that will undergo the linear pixel operations without decoding the entire source image.

In step 204, the system performs dequantization to the requested MCUs.

In step 206, the system performs the linear pixel operation to the requested MCUs. In the running example, the system modifies the DCT blocks with the linear pixel operations.

In step 208, the system performs quantization to the requested MCUs.

In step 210, the system performs entropy encoding to the requested MCUs and then rewrites the MCUs in their proper order back into the encoded bit stream.

Method 200 of FIG. 8 can also be used to perform a pixel replacement operation, such as redeye removal, to one or more MCUs in one embodiment of the invention. In this embodiment, the system would perform the pixel replacement in step 206.

FIG. 9 illustrates the use of the MCU index to transform the source image in one embodiment of the invention. For example, source image 40 represented by encoded bit stream 50 is rotated 90 degrees clockwise to form an image 40' represented by an encoded bit stream 50'. Conventionally, all of MCUs 1 to 4 would need to be decoded, buffered, reordered, and then written to disk or another storage device. By using the MCU index, the system can determine where the boundaries between MCUs 1 to 4 and then entropy decode, rotate, and entropy encode one MCU at a time in the new order. Specifically, the system can now process MCU 3 before MCU 1, then process MCU 1, then MCU 4, and finally MCU 2 after MCU 4. Thus, the system does not need to modify the encoding procedure and the system will only need to buffer one MCU at a time for rotating source image 40.

FIG. 10 illustrates the use of a block editing list to edit the source image in one embodiment of the invention. In a low profile system, external storage input/output is very slow. If a MCU need several editing operations, it is very inefficient to save the MCU after each edit. Thus, the system creates a block editing list 230 for each MCU block to store the editing actions received from a user. The system can merge several editing actions and then encode each MCU one at a time to the final encoded bit stream. Referring to FIG. 10, assume the system needs to enhance, rotate, and then crop MCU block 0. With the edit action list, the system can determine MCU 0 will be cropped out of the final image and therefore should not be processed.

Figure 11:
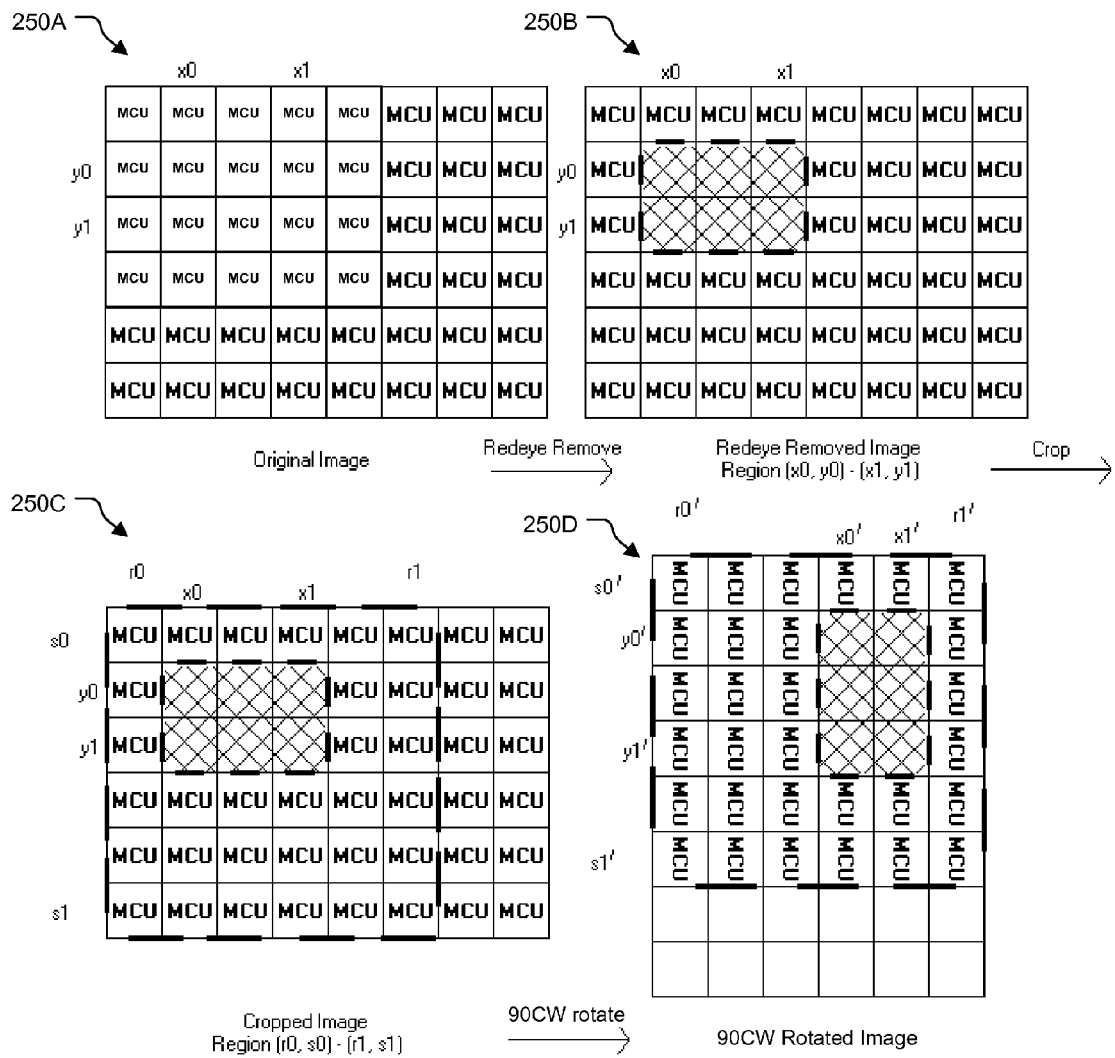
FIG. 11 illustrates some exemplary user editing operations to a source image to generate a final image in one embodiment of the invention.

FIG. 11 illustrates some exemplary user editing operations to a source image 250A to generate a final image 250D in one embodiment of the invention. FIGS. 12A, 12B, 12C, and 12D illustrate a data structure for tracking the editing operations and mapping the original MCUs in an original JPEG bit stream of image 250A to the new MCUs in a new JPEG bit stream of image 250D in one embodiment of the invention. Specifically, FIG. 12A shows a data structure 270A of source image 250A prior to any editing operations. Data structure 270A stores MCU block numbers and their corresponding MCU block coordinates and MCU block editing lists, which were described above in reference to FIG. 10.

Referring to FIG. 11, the user first instructs the system to remove redeye from a region consisting of (x0, y0) to (x1, y1) MCUs in source image 250A to form an image 250B. In response to the user instruction, the system records the redeye action ("Redeye Removal") in the editing action lists of (x0, y0) to (x1, y1) MCUs in data structure 270B shown in FIG. 12B.

Referring back to FIG. 11, the user next instructs the system to crop a region consisting of (r0, s0) to (r1, s1) MCUs in image 250B to form a child image 250C. In response to the user instruction, the system records the cropping action ("Not Available") in the editing action lists of (r1+1, s0) to (r1+2, s1) MCUs that are cropped out of child image 250C in data structure 270C shown in FIG. 12C.

Referring back to FIG. 11, the user then instructs the system to rotate child image 250C to form final image 250D. In response to the user instruction, the system calculates the new block coordinates of all the MCU blocks in data structure 270D shown in FIG. 12D. The system also records the rotation action ("90CW") in the editing action lists of (r0, s0) to (r1, s1) MCUs in data structure 270D. The rotation action is not recorded in (r1+1, s0) to (r1+2, s1) MCUs because their editing action lists indicate that these MCUs are cropped out of the final image 250D.

After all of the user editing actions, the system uses the final data structure 270D along with the MCU indexing method described above to encode the JPEG bit stream of final image 250D. Specifically, the system looks through the block coordinates stored in data structure 270D to determine the new order which the MCUs are to be encoded to represent final image 250D. In final image 250D, the first MCU is now (s0', r0') MCU. Using the entry of (s0', r0') MCU, the system reads the block number of (s0', r0') MCU in the original JPEG bit stream. Using the MCU indexing method described above, the system then retrieves (s0', r0') MCU from the original JPEG bit stream. The system next reads the block editing list of (s0', r0') MCU and processes the MCU block as instructed. The system then repeats this process for all the MCUs in the order which they appear in final image 250D.

Various other adaptations and combinations of features of the embodiments disclosed are within the scope of the invention. Numerous embodiments are encompassed by the following claims.

What is claimed is:

1. A method executed by a computer system for processing minimum coded units (MCUs) in a Joint Photographic Expert Group (JPEG) bit stream representing an image to transform the image, comprising:

generating a data structure storing MCU block numbers of the MCUs, MCU block coordinates of the MCUs in the image, and MCU block editing lists of the MCUs;

receiving one or more editing operations to be applied to one or more of the MCUs;

subsequent to said receiving, saving the editing operations to one or more of the MCU block editing lists of the MCUs affected by the editing operations; and subsequent to said saving, generating a new JPEG bit stream, comprising:

retrieving the MCUs from the JPEG bit stream; and for each retrieved MCU, decoding the retrieved MCU, processing the retrieved MCU according to any editing operations in a corresponding MCU block editing list, encoding the retrieved MCU, and saving the retrieved MCU in the new JPEG bit stream.

2. A method executed by a computer system for processing minimum coded units (MCUs) in a Joint Photographic Expert Group (JPEG) bit stream representing an image to transform the image, comprising:
- generating a data structure storing MCU block numbers of the MCUs, MCU block coordinates of the MCUs in the image, and MCU block editing lists of the MCUs;
- receiving an editing operation to be applied to a group of the MCUs;
- saving the editing operation to a group of the MCU block editing lists of the group of the MCUs affected by the editing operation;
- receiving another editing operation to the image, wherein the editing operation is a cropping of the image;
- saving the cropping operation to another group of the MCU block editing lists of another group of the MCUs being cropped out of the image; and
- performing editing operations in the MCU block editing lists excluding said another group of the MCU block editing lists.

3. The method of claim 1, wherein when one of the editing operations comprises a rotation, the method further comprises calculating new MCU block coordinates for the MCUs based on the rotation.

4. The method of claim 3, further comprising:
- determining a new order of the MCUs in the new JPEG bit stream after the rotation based on the new MCU block coordinates.

5. The method of claim 4, wherein said generating a new JPEG bit stream further comprises:
- from an index storing bit offsets from a start of the JPEG bit stream of the MCUs, reading the bit offsets of the MCUs;
- from the bit offsets, determining the boundaries of the MCUs in the JPEG bit stream; and
- wherein said retrieving the MCUs from the JPEG bit stream occurs in the new order.

6. The method of claim 1, wherein said generating a new JPEG bit stream further comprises:
- from an index storing bit offsets from a start of the JPEG bit stream of the MCUs, reading the bit offsets of the MCUs; and
- from the bit offsets, determining the boundaries of the MCUs in the JPEG bit stream for said retrieving.

7. A computer readable storage medium encoded with instructions for processing minimum coded units (MCUs) in a Joint Photographic Expert Group (JPEG) bit stream representing a image to transform the image, the instructions comprising:
- generating a data structure storing MCU block numbers of the MCUs, MCU block coordinates of the MCUs in the image, and MCU block editing lists of the MCUs;
- receiving one or more editing operations to be applied to one or more of the MCUs;
- subsequent to said receiving, saving the editing operations to one or more of the MCU block editing lists of the MCUs affected by the editing operation; and
- subsequent to said saving, generating a new JPEG bit stream, comprising:
  - retrieving the MCUs from the JPEG bit stream; and
  - for each retrieved MCU, decoding the retrieved MCU, processing the retrieved MCU according to any editing operations in a corresponding MCU block editing list, encoding the retrieved MCU, and saving the retrieved MCU in the new JPEG bit stream.

8. A computer readable storage medium encoded with instructions for processing minimum coded units (MCUs) in a Joint Photographic Expert Group (JPEG) bit stream representing a image to transform the image, the instructions comprising:
- generating a data structure storing MCU block numbers of the MCUs, MCU block coordinates of the MCUs in the image, and MCU block editing lists of the MCUs;
- receiving an editing operation to be applied to a group of the MCUs;
- saving the editing operation to a group of the MCU block editing lists of the group of the MCUs affected by the editing operation;
- receiving another editing operation to the image, wherein the editing operation is a cropping of the image;
- saving the cropping operation to another group of the MCU block editing lists of another group of the MCUs being cropped out of the image; and
- performing editing operations in the MCU block editing lists excluding said another group of the MCU block editing lists.

9. The medium of claim 7, wherein when one of the editing operations comprises a rotation, the instructions farther comprise calculating new MCU block coordinates for the MCUs based on the rotation.

10. The medium of claim 9, wherein the instructions further comprise:
- determining a new order of the MCUs in the new JPEG bit stream after the rotation based on the new MCU block coordinates.

11. The medium of claim 10, wherein said generating a new JPEG bit stream further comprises:
- from an index storing bit offsets from a start of the JPEG bit stream of the MCUs, reading the bit offsets of the MCUs;
- from the bit offsets, determining the boundaries of the MCUs in the JPEG bit stream; and
- wherein said retrieving the MCUs from the JPEG bit stream occurs in the new order.

12. The medium of claim 7, wherein said generating a new JPEG bit stream further comprises:
- from an index storing bit offsets from a start of the JPEG bit stream of the MCUs, reading the bit offsets of the MCUs; and
- from the bit offsets, determining the boundaries of the MCUs in the JPEG bit stream for said retrieiving.

* * * * *

UNITED STATES PATENT AND TRADEMARK OFFICE
CERTIFICATE OF CORRECTION

| | | |
|---|---|---|
| PATENT NO. | : 7,668,385 B2 | Page 1 of 1 |
| APPLICATION NO. | : 12/113866 | |
| DATED | : February 23, 2010 | |
| INVENTOR(S) | : Kaixuan Mao et al. | |

It is certified that error appears in the above-identified patent and that said Letters Patent is hereby corrected as shown below:

Column 8,
Line 31, Claim 9, "farther" should read --further--.

Signed and Sealed this
Twenty-fifth Day of January, 2011

David J. Kappos
*Director of the United States Patent and Trademark Office*